United States Patent [19]

Jacques et al.

[11] 4,273,735
[45] Jun. 16, 1981

[54] PRODUCTION OF SPHEROIDAL ALUMINA SHAPED ARTICLES

[75] Inventors: Roland Jacques, Ales; Regis Poisson, Sevres, both of France

[73] Assignee: Rhone-Poulenc Industries, Paris, France

[21] Appl. No.: 70,866

[22] Filed: Aug. 29, 1979

Related U.S. Application Data

[63] Continuation-in-part of Ser. No. 929,772, Jul. 31, 1978, abandoned.

[30] Foreign Application Priority Data

Aug. 3, 1977 [FR] France .............................. 77 23880

[51] Int. Cl.$^3$ .............................................. B01J 37/02
[52] U.S. Cl. ....................................... 264/5; 252/448; 252/463; 252/464; 252/465; 264/56
[58] Field of Search .................... 264/5, 56; 252/448, 252/463, 464, 468

[56] References Cited

U.S. PATENT DOCUMENTS 2,620,314  5/1969  Hoekstra ............................ 252/448
3,442,821  5/1969  Hilfman ............................. 252/448
3,600,129  8/1971  Vesely et al. ...................... 252/448

FOREIGN PATENT DOCUMENTS 1042771  11/1953  France .
739396  10/1955  United Kingdom ...................... 264/5

Primary Examiner—John Parrish
Attorney, Agent, or Firm—Burns, Doane, Swecker & Mathis

[57] ABSTRACT

Spheroidal alumina shaped articles are prepared by dispersing an ungelled admixture of an alumina sol and hexamethylenetetramine, in the form of droplets, into a liquid forming medium which is but very slightly miscible with water, said medium being at a temperature of between about 50° and 105° C., next aging the alumina spheres thus shaped at a temperature greater than about 105° C. at superatmospheric pressure, then secondarily aging said alumina spheres in a basic medium, and thence washing, drying and calcining said aged alumina spheres.

The resultant shaped articles are useful, e.g., catalysts or catalyst carriers/supports.

30 Claims, No Drawings

PRODUCTION OF SPHEROIDAL ALUMINA SHAPED ARTICLES

CROSS-REFERENCE TO RELATED APPLICATION

This application is a continuation-in-part of our co-pending application Ser. No. 929,772, filed July 31, 1978, now abandoned hereby expressly incorporated by reference in its entirety and relied upon.

BACKGROUND OF THE INVENTION

1. Field of the Invention

The present invention relates to a process for the production of alumina spheres, and, more especially, relates to the production of such spherical shaped articles from an alumina sol via a "sol/gel" process. The invention also relates to the use, e.g., as catalyst or catalyst carrier/support, of the resultant shaped articles.

2. Description of the Prior Art

It is known to this art to prepare spheroidal alumina particles from an alumina sol by the so-called "sol/gel" process, by dripping droplets of the alumina sol into mixtures comprising alumina in a water immiscible liquid, and thence gelling the spheres thus formed.

Thus, the U.S. Pat. No. 2,610,314 [hereby expressly incorporated by reference] describes a process consisting essentially of mixing solutions of an alumina sol and hexamethylenetramine; dispersing the mixture in the form of droplets into a water immiscible forming liquid; and therein aging the spherical shaped articles autogenously formed, at a temperature of 50° to 105° C. and under atmospheric pressure. The resulting spheres are thence subjected to a supplementary aging treatment in an ammoniacal medium and finally are washed, dried and calcined. This process displays the disadvantages of requiring very long aging periods and of necessitating high consumption of ammonia, particularly for the production of low density spheres. In addition, for a given density, the mechanical properties of the spheres are relatively poor.

In order to reduce the aging time required for sphere production, it was proposed, in French Pat. No. 1,172,385 [hereby also expressly incorporated by reference], to perform a single aging treatment in the forming liquid, under pressure and at a temperature in excess of 110° C.; consistent with this particular process, the additional stage of aging in a basic medium is thus entirely eliminated, following the overall aging in the forming liquid. This latter process, though, displays the particular disadvantage of not permitting the ready production of spheres having adequate pore volumes because of the very rapid variation of the pore volume with temperature.

SUMMARY OF THE INVENTION

It has now unexpectedly been determined that the production of alumina spheres can be very carefully controlled, and the resultant shaped articles shall display a wide density range and have excellent crush resistance, by successively subjecting the spheres formed in the forming or coagulation/gelation medium to a first aging treatment under pressure in a medium that is only very slightly miscible with water, and thence to a second aging treatment in an alkaline medium.

DETAILED DESCRIPTION OF THE INVENTION

According to the present invention, alumina spheres are shaped from solutions of an alumina sol, and is characterized in that aqueous solutions of an alumina sol and of hexamethylenetetramine are admixed at a temperature below the temperature of gelation; the mixture dispersed in the form of droplets in a liquid which is only very slightly miscible in water at a temperature comprised between 50° and 105° C.; the spheres which are formed in the liquid which is only very slightly miscible with water [desirably, the solubility of water in the liquid is lower than about 1000 ppm] are next aged at a temperature higher than 105° C., and at a pressure higher than atmospheric [the liquid must be stable under these conditions of temperature and pressure]; and the spheres are thence further, secondarily aged in a basic medium, and washed, dried and calcined. The term "alumina sol" according to the present invention includes all basic salts of aluminum having the general formula $Al_2(OH)_{6-a}X_a$, where X is at least one anion selected from the group constituted of the halogens, $NO_3^-$, $ClO_4^-$; for the purposes of this invention the aluminum hydroxychlorides are preferred. These basic salts of aluminum are conveniently obtained by the digestion of metallic aluminum with hydrochloric acid, or in a solution of $AlX_3$, by the electrolysis of a solution of an aluminum salt, by neutralizing a more or less basic aluminum salt with a base and eliminating the salt formed, by the reaction of an aluminum salt with an electron donor such as ethylene oxide and the elimination of the product formed, by contacting an aluminum salt with a solvent immiscible with water comprised of a long-chain aliphatic amine, followed by the recovery of the aqueous phase containing the basic salt and concentrating same, by peptizing a freshly precipitated alumina gel, or by the attack of an HX acid on an oxide or hydroxide of aluminum.

According to one embodiment of the invention, it is envisaged to either entirely or partially replace the original alumina sol by the sol of other elements, such as, for example, those, if they exist, of the elements of the Groups IB, IIIB, IVB, VB, VIB, IIIA, IVA, VA, VIA, VIII of the Periodic Table; it is equally as possible to admix the initial alumina sol with a variety of salts and, in particular, those formed from the metals of the Groups IB, IIB, IIIB, IVB, VB, IIIA, IVA, VA, VIA, VIIA, VIII and the elements of Group VIB of the Periodic Table. It too is equally as possible to mix the initial alumina sol with other catalytically active or inactive compounds, among which there may be mentioned: the powders of metals of the Groups IB, IIIB, IVB, VB, VIIB, IIA, IIIA, IVA, VA, VIA, VIIA, VIII and the elements of Group VIB; these powders may consist of the metals or the elements themselves, their oxides, their insoluble salts, their solid solutions and their mixed oxides.

The solution of the alumina sol employed according to the invention contains from 5 to 35% by weight of alumina, expressed as $Al_2O_3$, and has an atomic ratio, Al/X, comprised between 1.33 and 2.67. It should be noted that Al/X=2/a with regard to the general formula given hereinabove. According to another preferred embodiment of the invention, the concentration of the alumina in the initial solution of the sol is comprised between 15 and 30% by weight and the atomic ratio, Al/X, is comprised between 1.60 and 2.20.

The concentration of the hexamethylenetetramine solution employed in accordance with the invention is comprised between 15 and 45% by weight; preferably, it is approximately 30 to 45% by weight. The hexamethylenetetramine solution is intimately admixed with the solution of the alumina sol at a temperature below the gelation temperature of the mixture. The mixture is formulated with volume ratios of the hexamethylenetetramine/alumina sol solutions comprised between about 3:1 and 1:20, the value of said ratio especially depending on the alumina concentration and the value of the Al/X atomic ratio in the initial sol; it may be of advantage to prepare the mixture such that these volume ratios are comprised between 1:1 and 1:6.

Subsequently, the resultant mixture is dispersed, in the form of droplets, in a liquid having a very low miscibility with water. As the forming liquid, any liquid or mixture of liquids having very low miscibility with water and a density lower or higher than that of the droplets, may be used. As examples, the following liquids having but slight miscibility with water are noted as illustrative; gasoline, kerosene, dodecylbenzene, alcohols and the organic solvents in general. The droplets in the mixture gel or coagulate as a result of the neutralization of anions contained in the initial sol by the ammonia released during the hydrolysis of the hexamethylenetetramine. In order to obtain, according to the invention, suitable gelation of the droplets, it is advantageous to have the concentration of aluminum in the mixture comprised between 6 and 12% by weight, and preferentially between 7 and 11%; further, it is preferred that the molar ratio of hexamethylenetetramine/chlorine be higher than 0.17, and preferably comprised between 0.2 and 0.6, that the temperature of the forming liquid be between 50° and 105° C., and preferably between 85° and 95° C., and that the holding time in the forming medium be comprised between about 1 second and 2 hours.

Following this forming or shaping stage, the spheres thus obtained are aged in a medium having but slight miscibility with water, and of the same type as that comprising the forming medium. The aging treatment is effected at a temperature comprised between 105° and 260° C., and at a pressure greater than atmospheric, and at which the water contained in the gelled spheres is maintained in the liquid state. It may be of advantage to conduct this aging treatment at a temperature comprised between 120° and 150° C., and under a pressure comprised between 2 and 10 atmospheres, for a period of from 1 to 10 hours.

It is commonly acknowledged that hexamethylenetetramine hydrolyzes or decomposes at the temperature of the aging step into basic compounds; this is next followed by a neutralization of the chloride anions or other anions contained in the initial sol. In consonance with the invention, it is advantageous that, at the termination of the aging stages, the extent of neutralization of said anions, is at least 68%, and preferably is at least 80%; this specifically corresponds to an Al/X atomic ratio, measured on the washed spheres, of greater than 6.25, and preferably greater than 10. Following this first aging step, a second aging step is performed upon the spheres, in a basic medium.

As the basic medium, for purposes of the invention, any one of a number of basic solutions may be used, in particular, and exemplary of which, are solutions of sodium hydroxide, amines and ammonia. The temperature at which the aging treatment in basic medium is conducted is comprised between 50° and 100° C., and preferably comprised between 70° and 98° C.; the duration of such aging step may vary between 1 to 10 hours and the pH of the medium, measured at 25° C., is between 6 and 11, preferably between 8 and 10.

During this step of aging in basic medium, the transformation of the amorphous alumina gel into boehmite is effected. The control of the rate of crystallization to boehmite makes it possible to adjust textural characteristics, in particular the porosity and the diameter of the pores, as well as the mechanical properties of the resultant spheres upon washing, drying and calcining. It should be noted that pore volume and pore diameter of the spheres vary in the same sense as the boehmite content, this being consistent with the fact that their specific surfaces vary relatively slightly. The process of the invention thus yields alumina spheres having excellent mechanical properties with their characteristics, specifically their porosity, extending over a very great range. It is a particular advantage of the invention that it enables the extremely facile production of solid alumina spheres of variable porosity, same being easily adjusted by means of the simple control of the progress of the crystallization into boehmite.

After the step of aging in the basic medium, the spheres are washed with water in any convenient manner, optionally in the presence of small amounts of ammonia and/or of ammonium nitrate.

Following washing, the spheres are dried at a temperature of between about 90° and 200° C. for 1 to 24 hours, and then calcined at about 425°-760° C. for from about 2 to 10 hours. The spheres may be dried in a humid atmosphere.

The spheres thus obtained upon drying and calcining generally possess the following characteristics: they have a gamma-alumina structure; their mechanical strength, measured by the grain by grain crushing method for particles of 3 mm diameter, varies from 3 kg to 20 kg; their attrition is always greater than 99%; while their specific surface may vary from 150 m$^2$/g to 250 m$^2$/g; their pore diameter varies from 50° to 2000° A, with pore distribution being monomodal; their filling density varies from 0.2 g/cm$^3$ to 1g/cm$^3$, and their pore volume from 0.3 cm$^3$/g to 2.8 cm$^3$/g.

Hence, resultant shaped articles display remarkable mechanical properties with respect to attrition, resistance to crushing and sphericity. This combination of properties renders them useful to great advantage in fluid bed and mobile bed regenerating processes.

According to still another embodiment of the invention, the spheres may advantageously be impregnated with the various precursors of catalytic elements prior to the drying/calcining step; the hot water wash may also be performed during this stage in the process.

According to another embodiment of the invention, a supplementary washing stage may be conducted after drying and calcining.

And according to yet another embodiment of the invention, it is possible to calcine the resultant spheres at a temperature comprised between 760° and approximately 1000° C. [the temperature generally corresponding to the onset of the transformation to alumina with an alpha structure]. In this case, spheres are obtained with contain, depending on the temperature of calcination, mixtures of gamma and delta, then gamma and theta, then delta and theta phases. The specific surface of the spheres decreases without their pore volume being affected in appreciable amount, the spheres exhibiting, after calcination at a temperature between 760° and about 1000° C., a linear contraction of less than 2%, as measured by dilatometry. In a known manner, the transformation of alumina of the alpha phase may be retarded by the addition of stabilizers, such as, for example, of salts of rare earth metals, or of barium, or of ethyl silicate, to the initial salt or to the spheres obtained after drying and optional precalcination at a low temperature.

The alumina spheres of the present invention, which display excellent resistance to crushing over a very wide density range, may be used as adsorbents or catalytic agents. Thus, they may be used as catalysts, or as supports of, or carriers for, catalysts to effect different reactions, such as, for example: dehydration, hydrodesulfurization, hydrodenitrification, desulfurization, dehydrogenation, dehydrohalogenation and reforming, vapor reforming, cracking, hydrocracking, hydrogenation, dehydrocyclization of hydrocarbons and of other organic compounds. The alumina spheres of the invention are also particularly useful as catalysts, or catalyst supports in the treatment of the exhaust gases of internal combustion engines, or for the purification of residual industrial gases.

When the alumina spheres of the present invention are employed as catalyst supports, they can conveniently be associated with any catalytic constituents that conceivably may be used in the reaction(s) contemplated.

In order to further illustrate the present invention and the advantages thereof, the following specific examples are given, it being understood that the same are intended only as illustrative, and in nowise limitative.

Hereinafter, EGG [grain by grain crushing, expressed in kg] represents the resistance of the spheres to crushing; it is determined as the arithmetic average over ten tests, of the force required to crush a given sphere by the application of continuous and progressively greater force commencing from zero load. VPT denotes the total pore volume, expressed in cm$^3$/g; DRT the packed filling density, expressed in g/cm$^3$; S the specific surface measured by the one point method, expressed in m$^2$/g. In addition, the abbreviation HMT denotes hexamethylenetetramine.

EXAMPLE 1

Spheres were prepared according to the process of the invention by utilizing the following general mode of operation; the numerical data concerning said mode of operation are set forth in the Table I which follows:

Alumium hydroxychloride was prepared by digesting aluminum with hydrochloric acid to afford a given Al/Cl atomic ratio and a given $Al_2O_3$ content; the aluminum hydroxychloride was next mixed in a given volume ratio with a solution of hexamethylenetetramine having a given concentration by weight. The mixture had a given molar ratio of hexamethylenetetramine/chlorine and a given aluminum concentration; it was charged through capillaries into a column containing paraffin oil controlled at 90° C. After a retention or holding time of one hour in the forming medium, the spheres were dried and placed into an autoclave containing gasoline (boiling point 300° C.) to perform the stage of aging.

The temperature of the gasoline was next raised to a given value over a period of two hours and then maintained for the time period given in parentheses in order to bring the degree of neutralization to a given value. After removal from the autoclave, the spheres were separated from the gasoline and fed into a circulating reactor equipped with a condenser and containing changing water. When the temperature of the water was in equilibrium at 90° C., an ammonia solution was added so as to adjust the pH value of the medium as measured at 25° C., and the temperature maintained at a given value for a given time t given, after this, the ammonia medium was removed and replaced with distilled water at 90° C.; this washing operation was repeated four times. The spheres were then dried at 150° C. for five hours, then calcined at 600° C. for two hours. The properties of the spheres are given in the following table.

TABLE I

| | | EXAMPLE NO. | | | | | |
|---|---|---|---|---|---|---|---|
| Stages of the Process | Properties | 1 | 2 | 3 | 4 | 5 | 6 |
| Alumina sol | % $Al_2O_3$ | 20 | 30 | 20 | 19.55 | 25 | 18 |
| | Al/Cl | 2.07 | 1.67 | 2.07 | 2.16 | 2.07 | 2 |
| HMT solution | % HMT | 37 | 41 | 37 | 40 | 37 | 28 |
| HMT-alumina sol solution | Vol HMT | 0.2 | 0.71 | 0.2 | 0.14 | 0.28 | 0.37 |
| | Vol Sol HMT | 0.24 | 0.50 | 0.24 | 0.20 | 0.26 | 0.35 |
| | Cl % Al | 9 | 10 | 9 | 9.2 | 10.9 | 7.3 |
| Forming in oil | Temperature (°C.) | 90 | 90 | 90 | 90 | 90 | 90 |
| Aging in gasoline, in autoclave | Temperature (°C.) | 130 | 130 | 130 | 135 | 130 | 130 |
| | time at temperature (H) | 3 | 3 | 3 | 2 | 3 | 3 |
| | Degree of neutralization | 0.8 | 0.9 | 0.8 | 0.75 | 0.8 | 0.85 |
| Aging in an ammoniacal medium | Temperature (°C.) | 90 | 90 | 95 | 90 | 85 | 95 |
| | time (H) | 5 | 5 | 5 | 5 | 10 | 1 |
| | pH | 9.36 | 9.5 | 9.5 | 8.80 | 9.5 | 9 |
| Properties of finished spheres | EGG | 13 | 14 | 3.2 | 10.05 | 12 | 11 |
| | VPT | 0.74 | 0.70 | 1.77 | 0.57 | 0.75 | 0.70 |
| | DRT | 0.54 | 0.57 | 0.27 | 0.65 | 0.56 | 0.57 |
| | S | 175 | 173 | 166 | 185 | 180 | 170 |

EXAMPLE 2

This example, presented by way of comparison, illustrates the extremely rapid variation of the pore volume as a function of the aging temperature of the spheres in gasoline in the autoclave and, thus, the major disadvantage of the process as described in the French Patent No. 1,172,385.

The procedure followed was the same as in Experiment 1, of above Example 1, but without the aging step in the ammoniacal medium, i.e., the process entailed proceeding directly to the washing, drying and calcining of the spheres from the autoclave.

| AUTOCLAVE TEMPERATURE | VPT of finished spheres | DRT |
|---|---|---|
| 140° C. | 0.37 | 0.79 |
| 150° C. | 1.30 | 0.35 |

As is apparent from the above table, between 0.37 and 1.30 cm³/g of VPT, ΔVPT/ΔT=0.1 cm³/g/°C. It is, therefore, technologically difficult to control the porosity at a given value; this would require highly accurate temperature controls and the absence of any temperature heterogeneity in the autoclave.

EXAMPLE 3

This example, also given by way of comparison, illustrates the principal disadvantages presented by the process described in U.S. Pat. No. 2,620,314 as compared with the process of the invention. Spheres having a DRT of 0.54 g/cm³ were prepared.

According to the process of French Patent No. 1,042,771, the starting material was an alumina sol containing 12% by weight of alumina and having an atomic ratio of Al/Cl=1.46. This sol was mixed with a 28% hexamethylenetetramine solution in equal proportions by volume. The mixture was formed in a column of oil at 90° C. for 16 hours, then in a concentrated ammonia solution for 24 hours. Following washing, drying at 120° C. and calcining at 650° C., the spheres had a DRT of 0.54 g/cm³.

The production of spheres having a DRT of 0.54 g/cm³ according to the process of the invention corresponding to Experiment 1 of Example 1 hereabove required only an aging time in the autoclave of 5 hours and in ammonia of 5 hours, i.e., a total of 10 hours vis-a-vis 40 hours. In addition, the ammonia solution used to adjust the pH to 9.5 was only 1.2% by weight, as compared with the use of a concentrated ammonia solution.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the production of spheroidal alumina shaped articles, which comprises dispersing an ungelled admixture of an alumina sol and hexamethylenetetramine, in the form of droplets, into a liquid forming medium which is but very slightly miscible with water, said medium being at a temperature of between about 50° and 105° C., next aging the alumina spheres thus shaped at a temperature greater than about 105° C. at superatmospheric pressure, then secondarily aging said alumina spheres in a basic medium, and thence washing, drying and calcining said aged alumina spheres.

2. The process as defined by claim 1, wherein the alumina sol comprises a salt of the formula $Al_2(OH)_{6-a}X_a$ in which X is at least one anion selected from the group consisting of $F^-$, $Cl^-$, $Br^-$, $I^-$, $NO_3^-$ or $ClO_4^-$.

3. The process as defined by claim 1, wherein the alumina sol comprises a salt of formula $Al_2(OH)_{6-a}Cl_a$.

4. The process as defined by claim 1, wherein the alumina sol comprises from about 5 to 35% by weight of alumina, expressed as $Al_2O_3$.

5. The process as defined by claim 4, wherein concentration of the alumina is between about 15 and 30% by weight.

6. The process as defined by claim 2, wherein the alumina sol displays an atomic ratio of Al/X ranging from 1.33 to 2.67.

7. The process as defined by claim 6, wherein the alumina sol displays an atomic ratio of Al/X ranging from 1.60 to 2.20.

8. The process as defined by claim 1, wherein the hexamethylenetetramine comprising the admixture is a 15 to 40% by weight concentrated solution.

9. The process as defined by claim 8, wherein hexamethylenetetramine solution has a concentration ranging from 30 to 45% by weight.

10. The process as defined by claim 1, wherein the admixture comprises a solution of hexamethylenetetramine, the same being mixed with the alumina sol in a volumetric ratio of hexamethylenetetramine/alumina sol ranging from 3:1 to 1:20.

11. The process as defined by claim 10, wherein the volumetric ratio is ranging from 1:1 to 1:5.

12. The process as defined by claim 10, wherein the concentration of aluminum in the admixture is ranging from about 6 to 12% by weight.

13. The process as defined by claim 12, wherein the concentration of aluminum in the admixture is ranging from about 7 to 11% by weight.

14. The process as defined by claim 3, wherein the hexamethylenetetramine/chlorine ratio is greater than 0.17.

15. The process as defined by claim 14, wherein the hexamethylenetetramine/chlorine ratio is ranging from 0.2 to 0.6.

16. The process as defined by claim 1, wherein the temperature of the forming medium is ranging from about 85° to 95° C.

17. The process as defined by claim 1, wherein the retention time of the droplets in the forming medium is ranging from 1 to second and 2 hours.

18. The process as defined by claim 1, wherein the alumina spheres are aged in a liquid which is but very slightly miscible with water at a temperature ranging from 105° to 260° C.

19. The process as defined by claim 18, wherein the spheres are aged at a temperature ranging from 120° to 150° C., under a pressure of from 2 to 10 atmospheres, and for a period of from 1 to 10 hours.

20. The process as defined by claim 2, wherein, upon termination of the initial aging step, the degree of neutralization of the acid anions contained in the initial sol is at least 68%.

21. The process as defined by claim 20, wherein the degree of neutralization is at least 80%.

22. The process as defined by claim 1, wherein the secondary aging of the spheres in the basic medium is performed at a temperature comprised between about 50° and 100° C., for a period of between about 1 and 10 hours, the pH of said basic medium, measured at 25° C., being between about 6 and 11.

23. The process as defined by claim 22, wherein the spheres are aged in the basic medium at a temperature of between 70° and 98° C. and at a pH of between 8 and 10.

24. The process as defined in claim 1, wherein the basic medium comprises a medium selected from the group consisting of an ammoniacal solution, an amine solution and a sodium hydroxide solution.

25. The process as defined by claim 1, wherein the aged spheres are dried at a temperature of between about 90° and 200° C. for about 1 to 24 hours, and then calcined at a temperature of between about 425° and 1000° C. for from about 2 to 10 hours.

26. The process as defined by claim 1, wherein at least a portion of the alumina sol comprising the initial admixture has been replaced by a sol of an element selected from the group consisting of the elements of the Groups IB, IIIB, IVB, VB, VIB, IIIA, IVA, VA, VIA and VIII of the Periodic Table.

27. The process as defined by claim 1, wherein a salt of a metal selected from the group consisting of the metals of the Groups IB, IIB, IIIB, IVB, VB, IIA, IVA, VA, VIA, VIIA, VIII and VIB of the Periodic Table comprised the initial alumina sol.

28. The process as defined by claim 1, the initial alumina sol having admixed therewith a compound of a metal, or a metal itself, selected from the group consisting of the metals of the Groups IB, IIB, IVB, VB, VIIB, IIA, IIIA, IVA, VA, VIA, VIIA, VII or VIB of the Periodic Table.

29. The process as defined in claim 1, said forming medium being selected from the group consisting of gasoline, kerosene, dodecylbenzene, alcohol or organic solvent.

30. A process for the production of spheroidal alumina shaped articles, which comprises dispersing an ungelled admixture of an alumina sol and hexamethylenetetramine, in the form of droplets, into a liquid forming medium which is but very slightly miscible with water, said medium being at a temperature of between about 50° and 105° C., next aging the alumina spheres thus shaped in a medium having but slight miscibility with water at a temperature in the range of about 120° to 150° C. at superatmospheric pressure so that upon termination of said aging step the degree of neutralization of the acid anions contained in the initial sol is at least 68%, then secondarily aging said alumina spheres in a basic medium, and thence washing, drying and calcining said aged alumina spheres.

* * * * *